(12) United States Patent
Dhawan et al.

(10) Patent No.: US 6,472,500 B2
(45) Date of Patent: Oct. 29, 2002

(54) CRYSTALLINE POLYESTER RESINS AND PROCESSES FOR THEIR PREPARATION

(75) Inventors: Sandeep Dhawan; Gary Smith, both of Evansville, IN (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/681,831

(22) Filed: Jun. 13, 2001

(65) Prior Publication Data

US 2002/0028904 A1 Mar. 7, 2002

Related U.S. Application Data

(60) Provisional application No. 60/212,292, filed on Jun. 17, 2000.

(51) Int. Cl.[7] .............................................. C08G 63/78
(52) U.S. Cl. ..................... 528/275; 528/176; 528/181; 528/185; 528/275; 528/277; 528/280; 528/281; 528/283; 528/284; 528/286; 528/308; 528/308.6; 528/503; 526/65
(58) Field of Search ................................. 528/176, 181, 528/185, 275, 277, 279, 280, 281, 283, 284, 286, 308, 308.6, 503; 526/65

(56) References Cited

U.S. PATENT DOCUMENTS

| | | | |
|---|---|---|---|
| 3,018,272 A | 1/1962 | Griffing et al. | |
| 3,839,272 A | 10/1974 | Yankowsky | |
| 3,953,404 A | 4/1976 | Borman | |
| 4,066,627 A | 1/1978 | Borman et al. | |
| 4,147,738 A | 4/1979 | Borman | |
| 4,238,593 A | * 12/1980 | Duh | ........................ 528/272 |
| 4,278,785 A | 7/1981 | Rosenfeld | |
| 4,439,597 A | 3/1984 | Hall, Jr. et al. | |
| 4,525,524 A | 6/1985 | Tung et al. | |
| 4,656,241 A | 4/1987 | Iida et al. | |
| 4,680,376 A | 7/1987 | Heinze et al. | |
| 4,983,691 A | 1/1991 | Hergenrother et al. | |
| 5,663,281 A | 9/1997 | Brugel | |
| 6,232,435 B1 | 5/2001 | Heitz et al. | |

OTHER PUBLICATIONS

F. Pilati, et al. *Polymer Process Engineering* "A model Description for Poly(Butylene Terephthalate) Solid–State Polycondensation" pp. 303–319 (1986), Marcel Dekker, Inc.

* cited by examiner

Primary Examiner—Samuel A. Acquah

(57) ABSTRACT

An improved process for the preparation of high molecular weight, linear polyester resins comprises reacting an aromatic dicarboxylic acid with an excess of an alkane diol under conditions effective to reach the clearing point of the reaction; pre-condensing the cleared reaction mixture under conditions effective to produce oligomers having an intrinsic viscosity measured in 60/40 phenol/1,1,2,2-tetrachloroethane at 25° C. of less than about 0.70 deciliters/gram and a carboxylic acid end group level of less than or equal to about 100 milliequivalents per kilogram; and polycondensing the oligomer under conditions effective to produce a linear polyester resin having an intrinsic viscosity less than or equal to about 2.0 dl/g as measured in 60/40 phenol/1,1,2,2-tetrachloroethane by weight at 25° C. and a carboxylic acid end group level of about 10 to about 40 milliequivalents per kilogram.

34 Claims, 1 Drawing Sheet

CRYSTALLINE POLYESTER RESINS AND PROCESSES FOR THEIR PREPARATION

CROSS REFERENCE TO RELATED APPLICATIONS

This application claims the benefit of U.S. Provisional Application Ser. No. 60/212,292, filed Jun. 17, 2000.

BACKGROUND OF INVENTION

High molecular weight, linear polyester resins of the poly(alkylene terephthalate) family are known to be superior components in thermoplastic fibers, films and molding compositions, because of their excellent physical properties such as strength, toughness, and solvent resistance, in combination with their desirable appearance. Among the most useful such polyesters are poly(ethylene terephthalate), poly (1,3-propylene terephthalate), and poly(1,4-butylene terephthalate). Of these, poly(1,4-butylene terephthalate) is particularly valuable because it crystallizes very rapidly from the melt, and thus can be formulated into compositions that are moldable in conventional equipment with conventional temperature and cycle times, without any need for the addition of nucleating agents.

Poly(alkylene terephthalate) resins are commonly prepared by one of two methods. The first method occurs in two stages, and uses a dialkyl terephthalate (DTP) as a starting material. The first stage is transesterification of a lower $C_1$-$C_6$ alkyl terephthalate such as dimethyl terephthalate, with an excess of a diol such as ethylene glycol, 1,3-propanediol, or 1,4-butanediol, together with removal of the alcohol (e.g., methanol) byproduct. In the second stage, high molecular weight polyesters are produced by polycondensation of the intermediate product under vacuum and at high temperature, together with removal of the excess diol.

The second method uses terephthalic acid (TPA) as a starting material, and is also a two-stage process. The first stage is direct esterification of terephthalic acid using an excess of the diol in a heterogeneous reaction mixture. Because the terephthalic acid is insoluble in the mixture, the "clearing point" of the solution can be taken as an indicator of complete or almost-complete reaction of the terephthalic acid. The endpoint is thus not well defined. Depending on reaction conditions, the acid levels of the intermediates obtained at this stage (hereinafter referred to as ester interchange, EI) can vary from about 600 to less than 5 milliequivalents/kilogram (meq/kg).

The second stage when starting from terephthalic acid is also a polycondensation step, conducted at higher temperature and usually under vacuum. The variation in the acid endgroup levels after ester interchange greatly affects the polycondensation phase of the reaction and thus the resulting level of carboxylic acid end groups in the polymer. In the manufacture of poly (alkylene terephthalate) resins as currently practiced, intrinsic viscosity typically increases during the polycondensation step, with a simultaneous decrease in the acid level. This is clearly evident in the data presented in U.S. Pat. No. 5,663,281 to Brugel. The rapidity of the transition from the ester interchange step to the polycondensation step (particularly in a continuous process) also makes it difficult to control the level of carboxylic acid end groups in the product polymer.

It would be advantageous to use terephthalic acid as a reactant to form poly(alkylene terephthalate) resins, but to be able to control the level of carboxylic acid end groups as well as the intrinsic viscosity in the final polyester product. Lower acid levels in polyester are highly desirable for ensuring hydrolytic stability and melt stability. The higher acid endgroup levels are also useful, for example in blends with polycarbonate, where they serve to minimize transesterification between the polyester and polycarbonate. It would furthermore be particularly advantageous to have the ability to manufacture high molecular weight poly (alkylene terephthalate) resins having either low or high acid end group levels using the same processing equipment.

FIELD OF THE INVENTION

This invention relates to linear polyester resins, and in particular, to the preparation of high molecular weight, linear poly(alkylene terephthalate) resins.

SUMMARY OF INVENTION

A process for the preparation of high molecular weight, linear poly(alkylene terephthalate) resins comprises:

reacting an aromatic dicarboxylic acid with an excess of an alkane diol under conditions effective to reach the clearing point of the reaction;

pre-polymerizing the cleared reaction mixture under conditions effective to produce oligomers having an intrinsic viscosity measured in 60:40 phenol: 1,1,2,2-tetrachloroethane by weight at 25° C. of less than about 0.7 deciliters/gram (dl/g) and a carboxylic acid end group number of less than about 100 milliequivalents per kilogram (meq/kg); and polycondensing the oligomer under conditions effective to produce linear poly(alkylene terephthalate) resins having an intrinsic viscosity measured in 60:40 phenol:1,1,2,2-tetrachloroethane by weight at 25° C. of about 1.10 to about 1.70 dl/g and a carboxylic acid end group number of about 10 to about 40 meq/kg.

BRIEF DESCRIPTION OF DRAWINGS

The FIGURE is a graph of intrinsic viscosity (dl/g) vs. acid level (meq/kg), illustrating that a carboxylic acid level of about 10 to about 40 meq/kg may be produced from a process intermediate having an intrinsic viscosity of about 0.2 to about 0.4 dl/g and a carboxylic acid level of about 1 to about 7 meq/kg by varying the polycondensation conditions.

DETAILED DESCRIPTION

Figure 1:
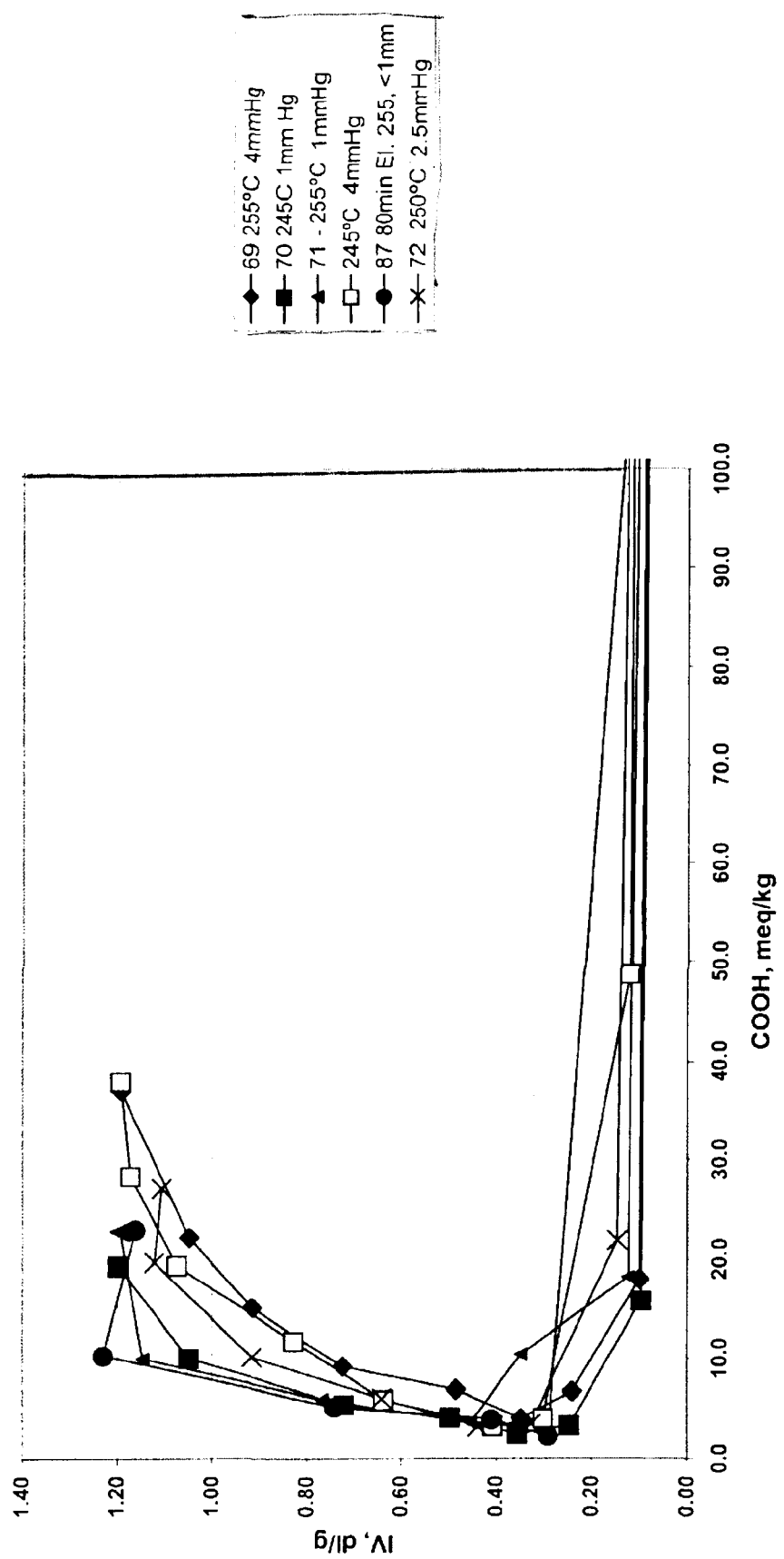

The inventors hereof have discovered a method whereby linear, high molecular weight poly (alkylene terephthalate) resins having either relatively low or relatively high levels of carboxylic acid end groups may be reproducibly obtained from an aromatic dicarboxylic acid starting material. In particular, the inventors have found that by effectively decreasing the acid endgroup concentration of an oligomer obtained prior to polycondensation to less than about 10 meq/kg, a high molecular weight polymer having either a lower or a higher carboxylic acid endgroup content may be obtained depending on polycondensation conditions. This method may be readily adapted to either batch or continuous processes, which in the prior art did not permit sufficient process control to attain the necessary low intrinsic viscosity, low acid level oligomer that the inventors have found necessary to establish control of the properties of the final resin.

In an especially advantageous feature, for the oligomer obtained by the reaction between terephthalic acid and 1,4-butanediol and having a carboxylic acid end group level of less than about 100, preferably less than about 40, and more preferably less than about 10 milliequivalents per kilogram (meq/kg), an intrinsic viscosity of about 0.05 to about 0.7, preferably about 0.1 to about 0.6, and more preferably about 0.15 to about 0.45 deciliters per gram (dl/g), as measured in 60/40 phenol/1,1,2,2-tetrachloroethane by weight at 25° C., the polycondensation thereof yields a linear poly(alkylene terephthalate) resin having an intrinsic viscosity of about 1.10 to about 1.30 dl/g as measured in 60:40 by weight of phenol:1,1,2,2-tetrachloroethane at 25° C. and a carboxylic acid endgroup level of about 30 to about 40 meq/kg. Such high levels of carboxylic acid endgroups have heretofore been obtained using a dialkylphthalate starting material.

Suitable reactants for formation of the linear poly(alkylene terephthalate) resins include at least one aromatic dicarboxylic acid and aliphatic diols, cycloaliphatic diols, or a mixture thereof, the alcohols containing from 2 to about 10 carbon atoms. The product alkylene polyesters have repeating units of the following general formula:

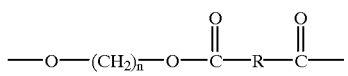

wherein n is an integer of from 2 to 10, and R is an aryl radical comprising a dicarboxylate residue derived from an aromatic dicarboxylic acid.

The aliphatic or cycloaliphatic diol may be ethylene glycol, 1,2-propanediol, 1,3-propanediol, 2-methyl-1,3-propane glycol, 1,4-butanediol, hexamethylene glycol, or neopentylidene glycol; or a diol such as hydroquinone or resorcinol. Of the foregoing, the preferred aliphatic diol is ethylene glycol and 1,4-butanediol. 1,4-butanediol is especially preferred.

Examples of aromatic dicarboxylic acids represented by the decarboxylated residue R are isophthalic or terephthalic acid, 1,2-di(p-carboxyphenyl)ethane, 4,4'-dicarboxydiphenyl ether, 4,4' bisbenzoic acid, and mixtures thereof. All of these acids contain at least one aromatic nucleus. Acids containing fused rings can also be present, such as in 1,4- 1,5- or 2,6-naphthalene dicarboxylic acids. The preferred dicarboxylic acids are terephthalic acid, isophthalic acid, naphthalene dicarboxylic acid, or a mixture thereof. Terephthalic acid is especially preferred.

Most of the catalysts and co-catalysts usually employed in polyesterification processes can be used herein with good results. Catalysts of alkali earth metals or alkaline earth metals as prescribed in U.S. Pat. No. 5,496,887 can be utilized and are incorporated herein by reference. Catalysts of tetrabutyl titanate with compounds containing as co-catalysts mixtures of at least one of Zn, Co, Mn, Mg, Ca or Pb as well as co-catalysts comprising an alkali metal phosphate, an alkali metal phosphite, an alkali hypophosphite and the like as prescribed in U.S. Pat. No. 5,519,108 are also incorporated herein by reference. Especially preferred are the known and conventional organotitanium and organotin polyesterification catalysts used singly or in admixture. Illustrative of useful organotitanium catalysts are titanium tetrabutoxide, tetramethyl titanate, ethylene glycol titanate, tetrabutylene glycol titanate, tetraisopropyl titanate, tetra(2-ethylhexyl)titanate, tetraoctyl titanate and tetrastearyl titanate and partially or completely hydrolyzed and transesterified products of the foregoing. Examples of organotin catalysts which are advantageously used herein include tetraethyl tin, triethyltin hydroxide, triphenyltin hydroxide, triisobutyltin acetate, dibutyltin diacetate, tributyltin acetate, diphenyltin dilaurate, monobutyltin trichloride, dibutyltin dichloride, tributyltin chloride, methylphenyltin oxide, dibutyltin oxide, didodecyltin oxide, dibutyltin sulfide and butylhydroxy tin oxide, and the like. Other conventional catalysts such as antimony oxide and the like can also be added. Of the foregoing, tetraisopropyl titanate is particularly preferred.

The first stage of production of the linear poly(alkylene terephthalate) is reacting an excess of an alkanediol with an aromatic dicarboxylic acid under conditions effective to reach the clearing point of the reaction (ester interchange). Effective conditions are known, or may be readily determined by one of ordinary skill in the art. For example, the molar ratio of diol to acid is advantageously within the range of from about 1.2:1, preferably about 2:1, to about 4:1, preferably about 3:1; a catalyst such as tetraisopropyl titanate is present in an amount from about 50, preferably about 90 parts per million (ppm), to about 400, preferably about 120 ppm based on the amount of titanium metal per weight of polymer; the temperature of the reaction is about 195, preferably about 200, to about 230, preferably about 220° C.; and the pressure is around atmospheric, from slightly positive pressure (e.g., 850 mm Hg) to slightly subatmospheric (e.g., 700 mm Hg) such as can be attained with an aspirator. Under these conditions, the clearing point is generally reached at about 180 minutes, although the time may vary from about 30 minutes to about 240 minutes. While the above specified conditions have been determined to produce said results, it is recognized that other conditions may also be effective depending upon reactor design, reactor size, and the like and are readily determined by one of ordinary skill in the art.

Within this restricted range of preferred temperatures, times and pressures, catalyst levels, and diol to acid mole ratio, at least 90%, and preferably at least about 95% of the carboxylic acid groups are reacted, i.e., converted to the corresponding hydroxyalkylene ester groups, which may or may not have also undergone subsequent transesterification. As mentioned above, the levels of carboxylic acid end groups at this stage may vary from about 5 to about 600 meq/kg.

In order to control the level of carboxylic acid end groups in the final product, while at the same time maintaining the desired high molecular weight of the final product, ester interchange is followed by pre-polymerization, wherein at least a portion of the excess alkane diol (e.g., 1,4-butanediol) is removed from the reaction mass under conditions effective to yield a low molecular weight oligomeric mixture having a pre-determined level of carboxylic acid end groups.

Effective pre-polymerization conditions are those that will remove excess alkane diol and result in pre-polymerization to the desired carboxylic acid end group level and viscosity, but that do not generate unwanted side products. Exemplary conditions include reducing the pressure of the cleared mixture to about 1 to about 700, preferably about 50 to about 650, and more preferably about 100 to about 600 millimeters of mercury (mm Hg), and/or elevating the temperature to about 220 to about 270, preferably about 225 to about 255, and more preferably about 230 to about 250° C. Under these conditions, pre-polymerization is generally completed in about 10 to about 120 minutes. Other conditions may also be effective depending upon reactor design, reactor size, and the like and are readily determined by one of ordinary skill in the art.

In general, and especially for the reaction between 1,4-butanediol and terephthalic acid, the preferred carboxylic acid end group level of the oligomeric mixture is about 0.5 to about 100, preferably about 1.0 to about 60 and more preferably about 0.5 to about 100, and most preferably about 1 to about 10 meq/kg. The intrinsic viscosity of the oligomeric mixture is about 0.05 to about 0.7, preferably about 0.1 to about 0.6, and more preferably about 0.15 to about 0.45 dl/g, as measured in a 60:40 mixture (by weight) of phenol:1,1,2,2-tetrachloroethane at 25° C.

After pre-polymerization to the selected level of acid end groups and intrinsic viscosity, the oligomeric mixture is subjected to polycondensation, wherein the remaining excess alkane diol and water (as well as any unwanted byproducts such as tetrahydrofuran) are removed. Effective polycondensation conditions are known, or may be determined experimentally without undue experimentation. Polycondensation typically is carried out at temperatures of about 235 to 270° C., preferably about 245° C., to about 265, preferably about 255° C.; and pressures of about 0.05, preferably about 0.1 mm Hg to about 10, preferably from about 0.1 mm Hg to about 5 mm Hg.

Under these conditions, the product linear poly(alkylene terephthalate) resin (e.g., a poly (1,4-butylene terephthalate) resin) has an intrinsic viscosity greater than or equal to about 0.8, preferably greater than or equal to about 0.9, and most preferably greater than or equal to about 1.10 dl/g, when measured in a solution of a 60:40 mixture of phenol and tetrachloroethane at 25° C. The intrinsic viscosity is preferably less than or equal to about 2.0, preferably less than or equal to about 1.6, and more preferably less than or equal to than about 1.3 dl/g when measured in a solution of a 60:40 mixture of phenol and tetrachloroethane at 25° C. The carboxylic acid end group level on the order of about 30 to about 40 meq/kg. These high intrinsic viscosities are attainable in anywhere from about one-half hour to about four hours under aforementioned vacuum and after the final high temperature has been achieved.

Alternatively, where linear, high molecular weight poly(alkylene terephthalate) resins having low carboxylic acid end groups levels (on the order of about 10 up to about 30 meq/kg) are desired, pre-polymerization is conducted as described above, but the polycondensation conditions are varied so as to result in low acid levels, while maintaining the same intrinsic viscosity of the final polymer. Such conditions are known, or may be determined without undue experimentation by those of ordinary skill in the art. (See Tables 1 and 2 below.)

In a preferred embodiment, in one manner of proceeding, commercially available 1,4-butanediol and terephthalic acid are mixed in the specified proportion and heated in a suitably sized reaction vessel, preferably mechanically stirred and optionally purged with an inert gas, for example nitrogen. Preferably, a polyesterification catalyst is included. The mixture is heated at a temperature from about 195 to about 220° C. and any byproducts, e.g. water, are distilled off. As soon as the mixture becomes clear (one-half hour to four hours, depending primarily on the temperature, 1,4-butanediol to terephthalic acid mole ratio, catalyst amount and type, and other reaction conditions), pre-polymerization step is initiated, during which some of the excess 1,4-butanediol is removed by applying a vacuum to the reactor, and raising the temperature to about 250° C. The vacuum is applied to the reactor over a period of about 30 minutes to about 120 minutes to attain a vacuum reading of 1 mm to about 5 mm Hg. After most of the 1,4-butanediol, water, tetrahydrofuran and any other byproducts have been removed, the reaction mixture is subjected to polycondensation, during which the temperature is raised, to about 270° C., preferably from about 240° C. to about 260° C., and the pressure is lowered to about 0.1 to about 4.0 mm Hg. The reaction is continued under these conditions until a highly viscous polymer of the desired molecular weight is obtained, generally from about one-half hour to about 4 hours, depending on the reactions precise polycondensation conditions. The resinous product is recovered from the reaction vessel by conventional methods. Of course other conditions may also be effective depending upon reactor design, reactor size, and the like and are readily determined by one of ordinary skill in the art.

The above-described method has a number of features and advantages. It allows use of terephthalic acid as a starting material, which obviates the need for a separate esterification step of the monomer. At the same time, the method allows the production of high molecular weight poly(alkylene terephthalate) resins while allowing control of the level of carboxylic acid end groups. In particular, linear, high molecular weight polyesters having levels of carboxylic acid end groups of about 30 to abut 40 meq/kg may be obtained from terephthalic acid.

This element of control is particularly significant with respect to large-scale production of poly(alkylene terephthalate) resins. Because resins having either low or high levels of carboxylic end groups may be made from substantially the same oligomeric intermediate, the same equipment may be used to produce a variety of resins. This results in far more economical manufacture of poly(alkylene terephthalate) resins.

The invention is further illustrated by the following non-limiting examples.

Example 1

The data in Table 1 below were generated by the following procedure, wherein 1,4-butanediol and terephthalic acid in a ratio of 2:1 were charged to a reaction vessel and 100 ppm of tetraisopropyl titanate was added. Ester interchange initiated by raising the temperature of the vessel to 220° C.

After the reaction had reached the clearing point (180 minutes), the level of carboxylic acid end groups was determined by titration with tetrabutylammonium hydroxide. Pre-polymerization was initiated by raising the temperature and reducing pressure. The acid level and intrinsic viscosity achieved during pre-polymerization are indicated by italics in Table 1. The level of carboxylic acid end groups was determined by titration with tetrabutylammonium hydroxide. Polycondensation was initiated by raising the temperature to the indicated temperature and reducing pressure in the reaction vessel for the indicated times. Intrinsic viscosity was determined in a 60/40 phenol/1,1,2,2-tetrachloroethane by weight at 25° C. [t,1]

TABLE 1

| | Pre-Polymerization and Polycondensation Conditions | | | | | | | | | | |
|---|---|---|---|---|---|---|---|---|---|---|---|
| | 255° C. | | 245° C. | | 255° C. | | 250° C. | | 245° C. | | 255° C. | |
| Time, Min | 4 mm Hg COOH | IV | 1 mm Hg COOH | IV | 1 mm Hg COOH | IV | 2.5 mm Hg COOH | IV | 4 mm Hg COOH | IV | 4 mm Hg COOH | IV |
| 180 | 151.7 | 0.08 | 124.5 | 0.08 | 123.8 | 0.10 | 340.3 | 0.06 | 455.4 | 0.07 | 188.4 | 0.09 |
| 200 | 18.0 | 0.10 | 15.8 | 0.10 | 18.2 | 0.12 | 21.9 | 0.15 | 48.7 | 0.12 | 30.0 | 0.13 |
| 220 | 6.7 | 0.24 | 3.3 | 0.25 | 10.4 | 0.35 | 3.5 | 0.33 | 4.0 | 0.30 | 5.1 | 0.25 |
| 240 | 4.0 | 0.35 | 2.5 | 0.36 | 3.6 | 0.45 | 3.2 | 0.44 | 3.3 | 0.41 | 2.3 | 0.35 |
| 260 | 6.3 | | 4.1 | 0.50 | 5.9 | 0.77 | | | | | 4.6 | 0.50 |

TABLE 1-continued

Pre-Polymerization and Polycondensation Conditions

| | 255° C. | | 245° C. | | 255° C. | | 250° C. | | 245° C. | | 255° C. | |
|---|---|---|---|---|---|---|---|---|---|---|---|---|
| Time, Min | 4 mm Hg COOH | IV | 1 mm Hg COOH | IV | 1 mm Hg COOH | IV | 2.5 mm Hg COOH | IV | 4 mm Hg COOH | IV | 4 mm Hg COOH | IV |
| 280 | 6.9 | 0.48 |  | 0.63 | 9.9 | 1.15 | 6.0 | 0.64 | 5.8 | 0.64 | | |
| 289 | | | | | 22.8 | 1.19 | | | | | | |
| 300 | 9.2 | 0.72 | 5.4 | 0.72 | | | | | | | 10.8 | 0.79 |
| 320 | 15.1 | 0.92 | | 0.94 | | | 10.1 | 0.92 | 11.8 | 0.83 | 16.3 | 0.93 |
| 340 | 22.1 | 1.05 | 10.0 | 1.05 | | | | | | | 23.5 | 1.08 |
| 360 | 37.0 | 1.19 | 19.3 | 1.20 | | | 19.7 | 1.12 | 19.4 | 1.07 | 34.1 | 1.08 |
| 380 | | | | | | | 27.1 | 1.11 | 28.3 | 1.17 | 48.7 | 1.06 |
| 395 | | | | | | | | | 37.9 | 1.19 | | |

As may be seen by reference to the above Table 1, after 180 minutes the level of carboxylic acid groups varied widely, from about 124 to about 455. During pre-polymerization, the acid levels generally decrease, with only small increases in viscosity. As polycondensation proceeds, the level of carboxylic acid end groups and the viscosity increase.

Example 2

The data in Table 2 below were generated by the following procedure, wherein 1,4-butanediol and terephthalic acid in a ratio of 2:1 or 3:1 were charged to a reaction vessel and tetraisopropyl titanate was added with levels varying from 100 to 203 ppm. Ester interchange was initiated by raising the temperature of the vessel to 220° C., while ester interchange time was varied from 110 to 180 minutes. After the reaction had reached the clearing point, pre-polymerization was initiated by raising the temperature and reducing pressure. The level of carboxylic acid end groups was determined by titration with tetrabutylammonium hydroxide. Polycondensation was initiated by raising the temperature to the indicated temperature and reducing pressure in the reaction vessel for the indicated times. Intrinsic viscosity was determined in 60:40 phenol:1,2,2-tetrachloroethane by weight at 25° C. [t2]

TABLE 2

| | | | EI[6] time | Polycondensation conditions | | | | |
|---|---|---|---|---|---|---|---|---|
| No. | Ti[1] ppm | BDO/TPA[2] | (min) | Temp. (° C.) | Pressure[3] | Time (min) | IV[4] | COOH[5] |
| 69 | 100 | 2 | 180 | 255 | 4 | 360 | 1.19 | 37 |
| 70 | 100 | 2 | 180 | 245 | 1 | 360 | 1.19 | 19 |
| 71 | 100 | 2 | 180 | 255 | 1 | 289 | 1.19 | 23 |
| 72 | 100 | 2 | 180 | 250 | 2.5 | 380 | 1.1 | 27 |
| 73 | 100 | 2 | 180 | 245 | 4 | 389 | 1.19 | 38 |
| 87 | 100 | 3 | 80 | 255 | 1 | 184 | 1.22 | 10 |
| 56* | 200 | 3 | 80 | 250 | <1 | 260 | 0.86 | 35 |
| 57* | 100 | 3 | 180 | 250 | <1 | 310 | 0.82 | 8 |
| 58* | 100 | 3 | 210 | 250 | <1 | 360 | 0.87 | 10 |
| 61* | 100 | 3 | 80 | 250 | <1 | 186 | 0.9 | 19 |
| 62* | 100 | 3 | 110 | 250 | <1 | 244 | 1.03 | 16 |
| 63 | 100 | 3 | 110 | 260 | <1 | 243 | 1.11 | 24 |
| 95 | 203 | 3 | 110 | 250 | <1 | 242 | 1.2 | 36 |
| 97* | 203 | 3 | 100 | 255 | <1 | 390 | 1.09 | 28 |
| 98 | 203 | 3 | 110 | 250 | <1 | 190 | 1.36 | 18 |
| 99 | 203 | 3 | 110 | 250 | <1 | 210 | 1.47 | 29 |

[1]Titanium catalyst measured in ppm.
[2]BDO/TPA represents the molar ratio of 1,4-butanediol to terephthalic acid.
[3]Pressure units are in mm Hg.
[4]IV indicates intrinsic viscosity; unit is dl/g.
[5]COOH indicates acid end group level; unit is meq/kg.
[6]EI indicates ester interchange.
*Not included for this invention.

The data in Table 2 shows, that by varying pressure, temperature and time during the polycondensation step varying levels of acid ranging from low (10 30 meq/kg) to high (30 to 40 meq/kg) can be obtained while maintaining a high viscosity between 1.10 to 1.70 dl/g.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A process for the prepatation of linear poly(alkylene terephthalate) resins, comprising:
   reacting an aromatic dicarboxylic acid with an excess of an alkane diol wherein the ratio of alkane diol to aromatic dicarboxylic acid is from about 1.2:1 to about 4:1 under conditions effective to reach the clearing point of the reaction;
   pre-polymerizing the cleared reaction mixture under conditions effective to produce an oligomeric mixture having an intrinsic viscosity measured in 60/40 phenol/ 1, 1, 2, 2,tetrachloroethane at 25° C. of less than or equal to about 0.70 dl/g and a carboxylic acid end group number of less than or equal to about 100 meq/kg; and
   polycondensing the oligomeric mixture under vacuum and temperature conditions effective to produce a linear poly (alkylene terephthalate) resin having an intrinsic viscosity measured in a solution of 60/40 phenol/1, 1, 2, 2-tetrachloroethane at 25° C. of greater than about 0.80 dl/g and a carboxylic acid end group number of about 10 to about 40 meq/kg.

2. The process of claim 1, wherein the aromatic dicarboxylic acid is selected from the group consisting of isophthalic or terephthalic acid, 1,2-di(p-carboxyphenyl)ethane, 4,4'-dicarboxydiphenyl ether, 4,4' bisbenzoic acid, and mixtures comprising at least one of the foregoing acids.

3. The process of claim 1, wherein the alkane diol is selected from the group consisting of ethylene glycol, 1,2-propanediol, 1,3-propanediol, 2-methyl-1,3-propane glycol, 1,4-butanediol, hexamethylene glycol, neopentylidene glycol, hydroquinone, resorcinol, and mixtures comprising at least one of the foregoing alcohols.

4. The process of claim 1, wherein the aromatic dicarboxylic acid is terephthalic acid and the alkane diol is 1,4-butanediol.

5. The process of claim 1, wherein reacting is between an alkancdiol and a dicarboxlic acid in the presence of a catalyst composition present in an amount of about 50 ppm to about 400 ppm based on the amount of titanium metal per weight of polymer, at a temperature of about 195° C. to about 230° C.

6. The process of claim 1, wherein the catalyst composition comprises a primary catalyst selected from the group consisting of organotitanium catalysts, organotin catalysts, titanium tetrabutoxide, tetramethyl titanate, ethylene glycol titanate, tetrabutylene glycol titanate, tetraisopropyl titanate, tetra(2-ethylhexyl)titanate, tetraoctyl titanate, tetrastearyl titanate, tetraethyl tin, triethyltin hydroxide, triphenyltin hydroxide, triisobutyltin acetate, dibutyltin diacetate, tributyltin acetate, diphenyltin dilaurate, monobutyltin trichloride, dibutyltin dichloride, tributyltin chloride, methylphenyltin oxide, dibutyltin oxide, didodecyltin oxide, dibutyltin sulfide and butylhydroxy tin oxide, tetraethyl titanate, tetraisopropyl titanate, antimony trioxide, hydrolyzed esters of the forgoing, and transesterified esters of the foregoing.

7. The process of claim 6, wherein the catalyst composition further comprises co-catalysts comprising of alkali earth metals, alkaline earth metals, or mixtures comprising at least one of the foregoing.

8. The process of claim 5, wherein the catalyst composition comprises a titanium catalyst; a first co-catalyst containing at least one of Zn, Co, Mn, Mg, Ca, or Pb; and a second co-catalyst containing an alkali metal phosphate, an alkali metal phosphite, an alkali hypophosphite, or an alkali metal.

9. The process of claim 1, wherein pre-polymerizing is conducted under a vacuum of about 1 to about 700 mm Hg and at a temperature of about 220 to about 270° C.

10. The process of claim 1, wherein the oligomeric mixture has an intrinsic viscosity measured in 60/40:phenol/ 1,1,2,2-tetrachloroethane by weight at 25° C. of less than or equal to about 0.6 dl/g.

11. The process of claim 1, wherein the oligomeric mixture has an intrinsic viscosity measured in 60/40:phenol/ 1,1,2,2-tetrachloroethane by weight at 25° C. of less than or equal to about 0.45 dl/g.

12. The process of claim 1, wherein the oligomeric mixture has a carboxylic acid end group number of less than or equal to about 60 meq/kg.

13. The process of claim 1, wherein the oligomeric mixture has a carboxylic acid end group number of less than or equal to about 10 meq/kg.

14. The process of claim 1, wherein the linear poly (alkylene terephthalate) has an intrinsic viscosity measured in 60/40:phenol/1,1,2,2-tetrachloroethane by weight at 25° C. of greater than about 0.9 dl/g.

15. The process of claim 1, wherein the linear poly (alkylene terephthalate) resin has an intrinsic viscosity measured in 60/40:phenol/1,1,2,2-tetrachloroethane by weight at 25° C. of about 1.10 to about 1.30 dl/g.

16. The process of claim 1, wherein the oligomeric mixture has an intrinsic viscosity about 0.10 to about 0.60 dl/g as measured in 60/40 phenol/1,1,2,2-tetrachloroethane by weight at 25° C. and a carboxylic acid end group level of about 1 to about 60 meq/kg, and the poly(alkylene terephthalate) resin has an intrinsic viscosity of about 0.90 dl/g to about 1.6 dl/g as measured in 60/40 phenol/1,1,2,2-tetrachloroethane by weight at 25° C., and a carboxylic acid end group level of about 10 to about 40 meq/kg.

17. The process of claim 11, wherein the oligomeric mixture has an intrinsic viscosity about 0.15 to about 0.45 dl/g as measured in 60/40 phenol/1,1,2,2-tetrachloroethane by weight at 25° C. and a carboxylic acid end group level of about 1 to about 10 meq/kg, and the poly(alkylene terephthalate) resin has an intrinsic viscosity of about 1.10 dl/g to about 1.30 dl/g as measured in 60/40 phenol/ 1,1,2, 2-tetrachloroethane by weight at 25° C., and a carboxylic acid level group level of about 10 to about 40 meq/kg.

18. A process for the preparation of a linear poly(1,4-butylene terephthalate) resin, the process comprising:
   heating at a temperature of about 195° C. to about 230° C. a mixture of terephthalic acid and 1,4-butanediol in the presence of a polyesterification catalyst composition until water substantially ceases to be evolved, said mixture comprising from about 350 to about 120 mole percent butanediol to terephthalic acid;
   applying a vacuum and continuing heating until an oligomeric mixture having a first selected viscosity and a first selected level of acid end groups is formed; and
   continuing the heating under vacuum and removing byproduct 1,4-butanediol until a poly(1,4-butylene terephthalate) resin having a second viscosity and a second selected level of acid end groups is formed.

19. The process of claim 18, wherein the first selected viscosity is about 0.05 to about 0.70 dl/g as measured in 60/40 phenol/1,1,2,2-tetrachloroethane by weight at 25° C., the first selected acid level is about 1 to about 100 meq/kg, the second selected viscosity is about 0.80 dl/g to about 2.0 dl/g as measured in 60/40 phenol/1,1,2,2-tetrachloroethane by weight at 25° C., and the second selected acid level is about 10 to about 40 meq/kg.

20. The process of claim 18, wherein the first selected viscosity is about 0.1 0 to about 0.60 dl/g as measured in 60/40 phenol/1,1,2,2-tetrachloroethane by weight at 25° C., the first selected acid level is about 1 to about 60 meq/kg, the second selected viscosity is about 0.90 dl/g to about 1.6 dl/g as measured in 60/40 phenol/1,1,2,2-tetrachloroethane by weight at 25° C., and the second selected acid level is about 10 to about 40 meq/kg.

21. The process of claim 18, wherein the first selected viscosity is about 0.15 to about 0.45 dl/g as measured in 60/40 phenol/1,1,2,2-tetrachloroethane by weight at 25° C., the first selected acid level is about 1 to about 10 meq/kg, the second selected viscosity is about 1.10 dl/g to about 1.30 dl/g as measured in 60/40 phenol/1,1,2,2-tetrachloroethane by weight at 25° C., and the second selected acid level is about 10 to about 40 meq/kg.

22. The process of claim 18, wherein the second selected acid level is about 10 to about 30 meq/kg.

23. The process of claim 18, wherein the second selected acid level is about 30 to about 40 meq/kg.

24. A process for the preparation of a linear poly(1,4-butylene terephthalate) resin, the process comprising the steps of:
   directly esterifying a reaction mixture consisting essentially of terephthalic acid, 1,4-butanediol, and an optional catalyst until the clearing point;
   pre-polymerizing the cleared reaction to produce an oligomeric mixture having an acid end group level of about 0.5 to about 100 meq/kg, and an intrinsic viscosity of about 0.05 to about 0.70 dl/g as measured in 60/40 phenol/1,1,2,2-tetrachloroethane by weight at 25° C.; and
   polycondensing the oligomeric mixture to produce a poly(1,4-butylene terephthalate) having an acid end group level of about 10 to about 40 meq/kg and an intrinsic viscosity of greater than or equal to about 0.80 dl/g as measured in 60/40 phenol/1,1,2,2-tetrachloroethane by weight at 25° C.

25. The process of claim 24, wherein the poly(1,4-butylene terephthalate) has an acid end group level of about 10 to about 30 meq/kg.

26. The process of claim 24, wherein the poly(1,4-butylene terephthalate) has an acid end group level of about 30 to about 40 meq/kg.

27. The process of claim 24, wherein the oligomeric mixture has an intrinsic viscosity measured in 60/40:phenol/1,1,2,2-tetrachloroethane by weight at 25° C. of less than or equal to about 0.6 dl/g.

28. The process of claim 24, wherein the oligomeric mixture has an intrinsic viscosity measured in 60/40:phenol/1,1,2,2-tetrachloroethane by weight at 25° C. of less than or equal to about 0.45 dl/g.

29. The process of claim 24, wherein the oligomeric mixture has a carboxylic acid end group number of less than or equal to about 60 meq/kg.

30. The process of claim 24, wherein the oligomeric mixture has a carboxylic acid end group number of less than or equal to about 10 meq/kg.

31. The process of claim 24, wherein the linear poly(alkylene terephthalate) has an intrinsic viscosity measured in 60/40:phenol/1,1,2,2-tetrachloroethane by weight at 25° C. of greater than about 0.9 dl/g.

32. The process of claim 24, wherein the linear poly(alkylene terephthalate) resin has an intrinsic viscosity measured in 60/40:phenol/1,1,2,2-tetrachloroethane by weight at 25° C. of about 1.10 to about 1.30 dl/g.

33. The process of claim 24, wherein the oligomeric mixture has an intrinsic viscosity about 0.10 to about 0.60 dl/g as measured in 60/40 phenol/1,1,2,2-tetrachloroethane by weight at 25° C. and a carboxylic acid end group level of about 1 to about 60 meq/kg, and the poly(alkylene terephthalate) resin has an intrinsic viscosity of about 0.90 dl/g to about 1.6 dl/g as measured in 60/40 phenol/1,1,2,2-tetrachloroethane by weight at 25° C., and a carboxylic acid end group level of about 10 to about 40 meq/kg.

34. The process of claim 24, wherein the oligomeric mixture has an intrinsic viscosity about 0.15 to about 0.45 dl/g as measured in 60/40 phenol/1,1,2,2-tetrachloroethane by weight at 25° C. and a carboxylic acid end group level of about 1 to about 10 meq/kg, and the poly(alkylene terephthalate) resin has an intrinsic viscosity of about 1.10 dl/g to about 1.30 dl/g as measured in 60/40 phenol/1,1,2,2-tetrachloroethane by weight at 25° C., and a carboxylic acid level group level of about 10 to about 40 meq/kg.

* * * * *